United States Patent
Kim et al.

(10) Patent No.: US 12,141,196 B2
(45) Date of Patent: Nov. 12, 2024

(54) ARTIFICIAL INTELLIGENCE-BASED SIMILAR SOUND SOURCE SEARCH SYSTEM AND METHOD

(71) Applicant: POZALabs Co., Ltd., Seoul (KR)

(72) Inventors: Tae Hyun Kim, Seoul (KR); Jun Byeong Lee, Seoul (KR); Hyo Seob Kim, Namyangju-si (KR); Hee Taek Lim, Seoul (KR)

(73) Assignee: POZALabs Co., Ltd., Seoul (KR)

( * ) Notice: Subject to any disclaimer, the term of this patent is extended or adjusted under 35 U.S.C. 154(b) by 0 days.

(21) Appl. No.: 18/222,405

(22) Filed: Jul. 14, 2023

(65) Prior Publication Data
US 2024/0176815 A1  May 30, 2024

(30) Foreign Application Priority Data
Nov. 30, 2022 (KR) .................. 10-2022-0163812

(51) Int. Cl.
*G06F 7/00* (2006.01)
*G06F 16/00* (2019.01)
*G06F 16/63* (2019.01)
*G06N 3/0464* (2023.01)

(52) U.S. Cl.
CPC ........... *G06F 16/63* (2019.01); *G06N 3/0464* (2023.01)

(58) Field of Classification Search
None
See application file for complete search history.

(56) References Cited

U.S. PATENT DOCUMENTS

| | | | |
|---|---|---|---|
| 9,031,243 B2 * | 5/2015 | LeBoeuf | G10L 25/51 381/56 |
| 2020/0035226 A1 * | 1/2020 | Hamada | G10L 15/10 |
| 2022/0036915 A1 * | 2/2022 | Koretzky | G10L 21/14 |
| 2023/0259692 A1 * | 8/2023 | Wright | G06F 40/56 704/9 |

FOREIGN PATENT DOCUMENTS

| | | |
|---|---|---|
| KR | 10-2008-0000234 | 1/2008 |
| KR | 10-2021-0046416 | 4/2021 |

OTHER PUBLICATIONS

English Specification of 10-2008-0000234.
English Specification of 10-2021-0046416.

\* cited by examiner

*Primary Examiner* — Tuan A Pham
(74) *Attorney, Agent, or Firm* — Paratus Law Group, PLLC

(57) ABSTRACT

The present disclosure relates to an artificial intelligence-based similar sound source search system and method for searching for a matching sound source by identifying timbre, pitch, and chord information using a convolutional neural network (CNN) and comprises a sound source input unit, a sound source analysis unit, a sound source information extraction unit, and a matching sound source search unit.

11 Claims, 3 Drawing Sheets

ARTIFICIAL INTELLIGENCE-BASED SIMILAR SOUND SOURCE SEARCH SYSTEM AND METHOD

CROSS-REFERENCE TO RELATED APPLICATION

This application claims priority to Korean Patent Application No. 10-2022-0163812 filed in the Korean Intellectual Property Office on Nov. 30, 2022, the disclosure of which is incorporated by reference herein in its entirety.

TECHNICAL FIELD

The present disclosure relates to an artificial intelligence-based similar sound source search system and method, and more particularly, an intelligence-based similar sound source search system and method for searching for a matching sound source by recognizing timbre, pitch, and chord information through a convolutional neural network (CNN).

DISCUSSION OF RELATED ART

In general, regardless of place or time, listening to music online using a smart device is becoming common. In line with this trend, sound source providing sites provide music according to the user's taste, and in particular, various technologies are being developed that analyze the music preferred by the user and recommend music predicted to be highly preferred.

For example, a music recommendation system and method are described in Korean Patent Publication No. 10-2008-000234, which is one of music providing technologies reflecting preferences. The music recommendation system and method described above sets a region from the maximum concentrated measure having the highest waveform concentration detected from sound source data to a certain number of measures as a representative melody, presents test music to the user, collects the representative melody preferred by the user, compares the representative melody of the sound source data with the representative melody of the user, and recommends sound source data similar to the representative melody preferred by the user.

Meanwhile, as the number of platforms that allow individuals to create new content and share it with others on the web increases, interest in the production of creative content such as sound sources is also increasing. There is a need for a way to eliminate concerns about copyright infringement by performing a verification procedure to determine whether a newly created sound source has copyright infringement issues before registering a creative work such as an actual sound source with the Copyright Association.

SUMMARY

The present disclosure was derived from such a technical background, and the purpose of the present disclosure is to provide an artificial intelligence-based similar sound source search system and method that can more accurately match a sound source with a high degree of similarity in searching for a sound source similar to an input reference sound source.

The present disclosure for achieving the above object includes the following configuration.

The artificial intelligence-based similar sound source search method according to an embodiment of the present disclosure comprises a sound source input unit for receiving a reference sound source, a sound source analyzing unit for analyzing waveform of the reference sound source input through the sound source input unit, a sound source information extraction unit for extracting sound source information data including at least one of genre, beats per minute (BPM), scale, and chord progression information for a reference sound source by applying the analysis result of the sound source analyzing unit as an input value of an artificial intelligence model by the artificial intelligence model, and a matching sound source search unit for searching for a matching sound source that matches a predetermined standard or more by comparing the sound source information data stored in the database with the sound source information data of the reference sound source extracted from the sound source information extraction unit.

In an artificial intelligence-based similar sound source search method executed on a computer device, the computer device includes at least one processor configured to execute computer readable instructions contained in a memory, and the artificial intelligence-based similar sound source search method comprises a sound source input step for receiving a reference sound source, a sound source analyzing step for analyzing waveform of the reference sound source input through the sound source input unit, a sound source information extraction step for extracting sound source information data including at least one of genre, beats per minute (BPM), scale, and chord progression information for a reference sound source by applying the analysis result of the sound source analyzing unit as an input value of an artificial intelligence model by the artificial intelligence model, and a matching sound source search step for searching for a matching sound source that matches a predetermined standard or more by comparing the sound source information data stored in the database with the sound source information data of the reference sound source extracted from the sound source information extraction unit.

The present disclosure has an effect of providing an artificial intelligence-based similar sound source search system and method that can more accurately match a sound source with a high degree of similarity in searching for a sound source similar to an input reference sound source.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

The terms used in this specification will be briefly described, and the present disclosure is described in detail.

It should be noted that technical terms used in the present disclosure are only used to describe specific embodiments and are not intended to limit the present disclosure. Further, technical terms used in the present disclosure should be interpreted in terms commonly understood by those of ordinary skill in the art to which the present disclosure belongs, unless otherwise defined in the present disclosure, and it should not be interpreted in an overly comprehensive sense or an overly narrow sense.

Hereinafter, preferred embodiments according to the present disclosure are described in detail with reference to the accompanying drawings.

Figure 1:
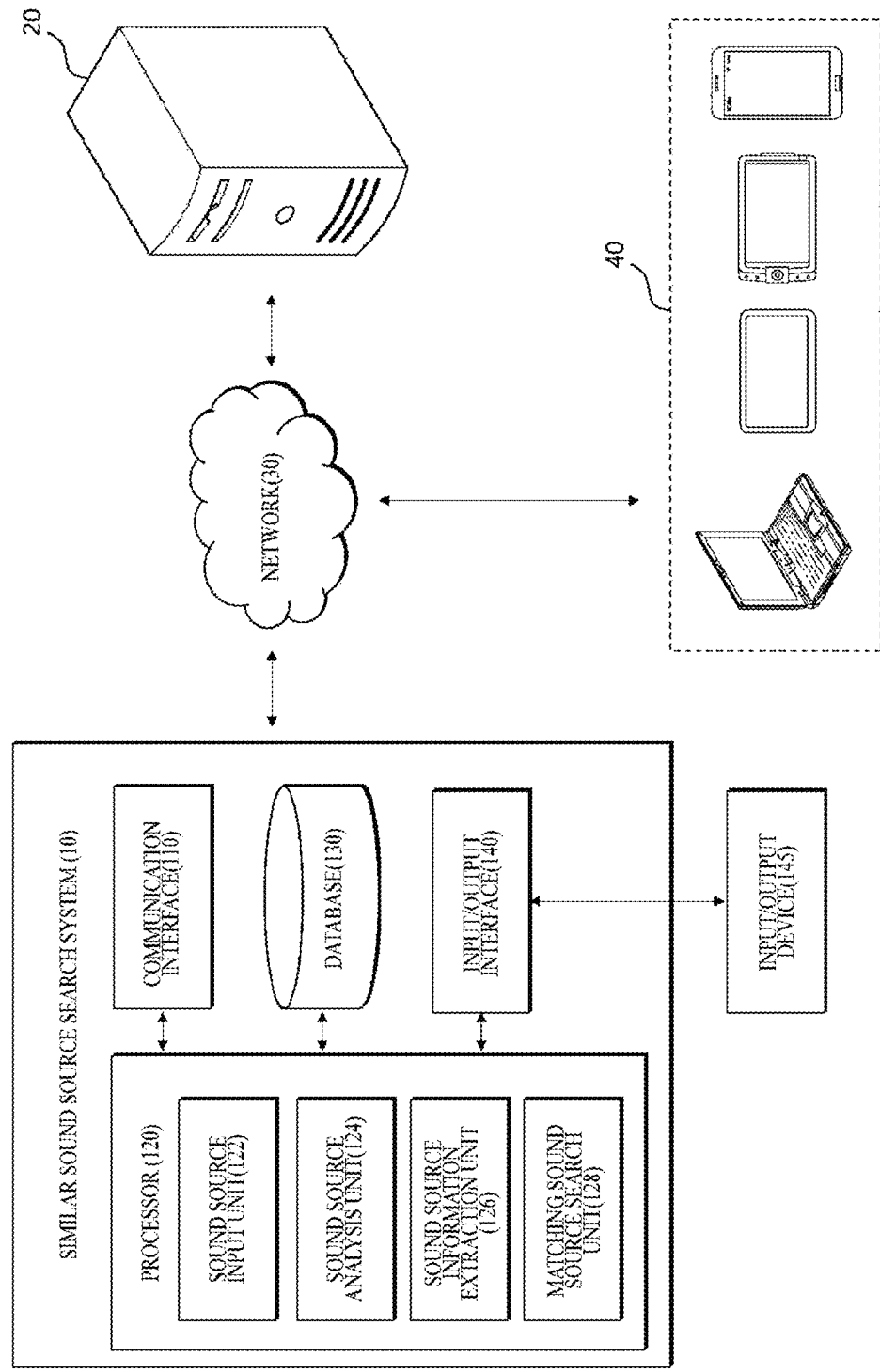
FIG. 1 is a block diagram for showing the configuration of an artificial intelligence-based similar sound source search system according to an embodiment of the present disclosure.
Figure 2:
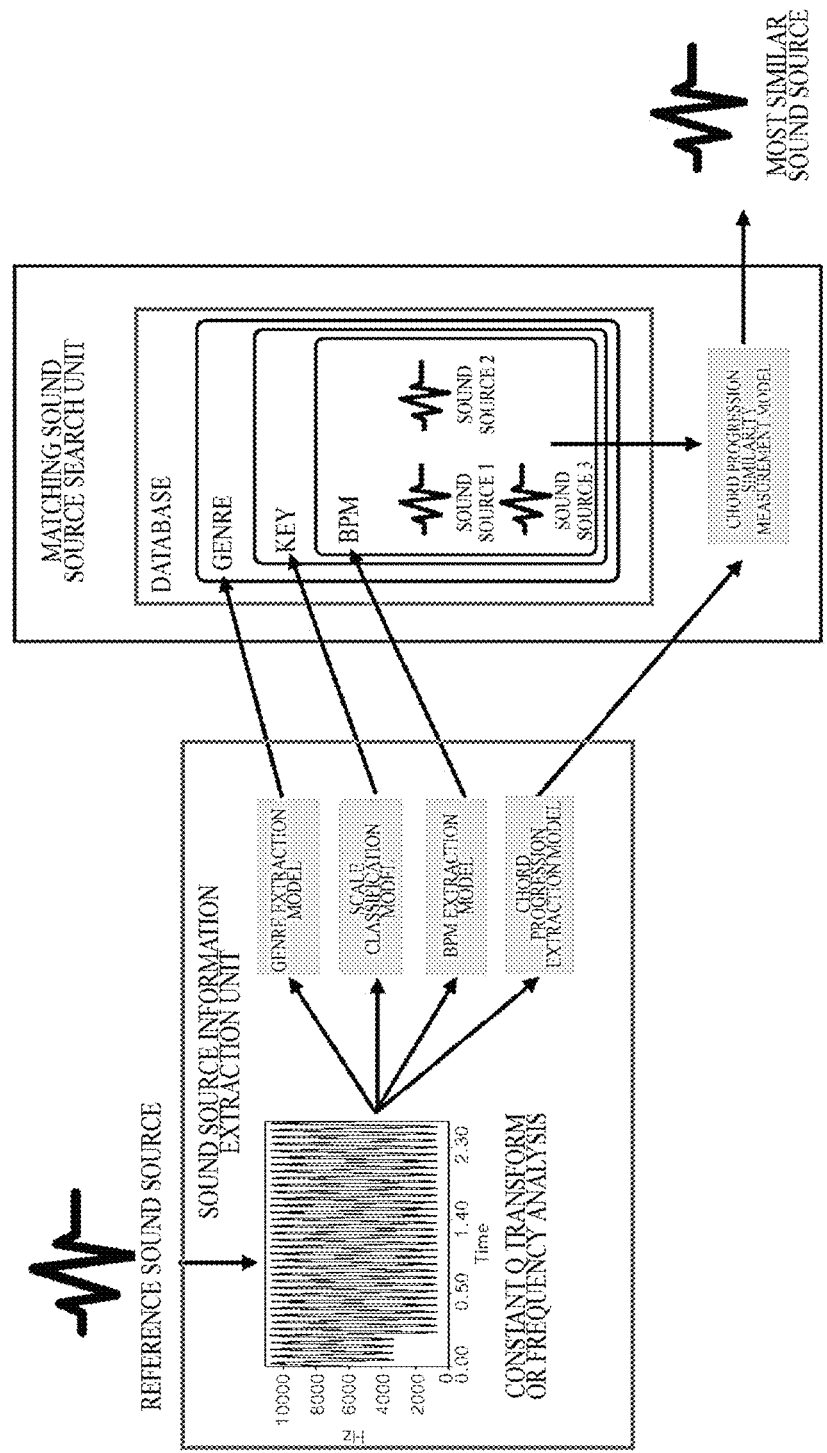
FIG. 2 is an exemplary view for explaining the operation of an artificial intelligence-based similar sound source search system according to an embodiment of the present disclosure.

FIG. 1 is a block diagram for showing the configuration of an artificial intelligence-based similar sound source search system according to an embodiment of the present disclosure, and FIG. 2 is an exemplary view for explaining the operation of an artificial intelligence-based similar sound source search system according to an embodiment of the present disclosure.

FIG. 1 is an exemplary view for illustrating a network environment including an artificial intelligence-based similar sound source search system 10 according to an embodiment. The network environment described in FIG. 1 shows an example including a user terminal 40 implemented with a plurality of electronic devices, an artificial intelligence-based similar sound source search system 10, a plurality of servers 20, and a network 30.

FIG. 1 is an example for explanation of the present disclosure, and the number of electronic devices or servers is not limited as shown in FIG. 1. Further, the network environment of FIG. 1 is only for explaining one example of environments applicable to one embodiment of the present disclosure, and the environment applicable to one embodiment of the present disclosure is limited to the network environment of FIG. 1.

The user terminal 40, which can be implemented as a plurality of electronic devices, may be a fixed terminal implemented as a computer device or a mobile terminal.

The user terminal 40 may be implemented as a computer capable of accessing a remote server or terminal through a network. Here, the computer may include, for example, a laptop computer or a desktop computer equipped with a web browser. Further, The user terminal 40 may be implemented as a terminal capable of accessing a remote server or terminal through a network. The user terminal 40 may for example, include all kinds of handheld-based wireless communication devices such as personal communication system (PCS), global system for mobile communications (GSM), personal digital cellular (PDC), personal handyphone system (PHS), personal digital assistant (PDA), international mobile telecommunication (IMT)-2000, code division multiple access (CDMA)-2000, W-code division multiple access (W-CDMA), wireless broadband internet (Wibro) terminal, smartphone, smart pad, and tablet PC. as a wireless communication device that ensures portability and mobility, In embodiments of the present disclosure, the user terminal 40 may mean one of various physical computer devices capable of communicating with other user terminals 40 and/or servers 20 over a network using substantially wireless or wired communication methods.

The communication method is not particularly limited, and it may include short-range wireless communication between devices as well as a communication method utilizing a communication network (for example, mobile communication network, wired Internet, wireless Internet, broadcasting network) that the network 30 may include. For example, the network 30 may include one or more arbitrary networks such as a personal area network (PAN), a local area network (LAN), a campus area network (CAN), a metropolitan area network (MAN), a wide area network (WAN), and a broadband network (BBN). and Internet. Further, the network 30 may include any one or more of network topologies including a bus network, a star network, a ring network, a mesh network, a star-bus network, a tree or a hierarchical network, and the like, but is not limited thereto.

The server 20 may be implemented as a computer device or a plurality of computer devices that communicate with a plurality of electronic devices through the network 30 to provide instructions, codes, files, contents, services, and the like. For example, the server 20 provides a service (for example, similar sound source search service, content provision service such as sound source, video/voice call service, messaging service, mail service, social network service, map service, translation service, financial service, payment service, search service, etc.) to the user terminal 40, which accesses the server through a network 30.

In one embodiment, the similar sound source search system 10 may be physically mounted integrally in one of the user terminals 40 or integrally mounted in the server 20. As shown in FIG. 1, it may be implemented as a physically independent computing device.

When implemented as a physically independent computer device, the similar sound source search system 10 may include a communication interface 110, a processor 120, a database 130, and an input/output interface 140 as shown in FIG. 1.

The communication interface 110 communicates with any internal component or at least one external terminal through a wired/wireless communication network. Here, wireless Internet technologies include wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), etc., and the communication interface 110 transmits and receives data according to at least one wireless Internet technology within a range including Internet technologies not listed above.

Further, short-range communication technologies may include Bluetooth, radio frequency identification (RFID), infrared data association (IrDA), ultra-wideband (UWB), ZigBee, and near field communication (NFC), ultrasound communication (USC), visible light communication (VLC), Wi-Fi, Wi-Fi Direct, and the like may be included. Further, wired communication technologies may include power line communication (PLC), USB communication, Ethernet, serial communication, optical/coaxial cables, and the like.

The database 130 is a computer-readable recording medium and may include a random access memory (RAM), a permanent mass storage device such as a read only memory (ROM) and a disk drive. Here, a permanent mass storage device such as a ROM and a disk drive may be included in the computer device as a separate permanent storage device separate from the database 130.

Further, an operating system and at least one program code may be stored in the database 130. These software components may be loaded into the database from a computer-readable recording medium separate from the database. The separate computer-readable recording medium may include a computer-readable recording medium such as a floppy drive, a disk, a tape, a DVD/CD-ROM drive, and a memory card.

In another embodiment, software components may be loaded into the database 130 through the communication interface 110 rather than a computer-readable recording medium. For example, software components may be loaded into the database 130 of the similar sound source search system 10 based on a computer program installed by files received through the network 30.

In one embodiment, the database 130 stores sound source data that can be compared with reference sound source data input by a user to search for a similar sound source. The sound source data stored in the database 130 may be automatically updated at any time or periodically.

For example, a user may designate a specific web space, download sound source data uploaded to a designated web space, such as a sound source site or a copyright registration site, and store them in the database 130.

The processor 120 may be configured to process instructions of a computer program by performing basic arithmetic, logic, and input/output operations. instructions may be provided to processor 120 by database 130 or communication interface 110. For example, processor 120 may be configured to execute received instructions according to program codes stored in a recording device such as database 130.

The communication interface 110 provides functionality for a computer device to communicate with an additional device (for example, the storage devices described above) over network 30. For example, requests, instructions, data, files, etc. generated according to program codes stored in a recording device such as the database 130 by the processor 120 of the similar sound source search system 10 may be transmitted to are other devices via the network 30 under the control of the communication interface 110.

Conversely, signals, instructions, data, files, etc. from other devices may be received by the similar sound source search system 10 through the communication interface 110 of the similar sound source search system 10 via the network 30. Signals, instructions, data, etc. received through the communication interface 110 may be transmitted to the processor 120 or the database 130, and files, etc. may be further included in a storage medium (for example, the permanent storage device described above). which may further be included in the similar sound source search system 10.

The input/output interface 140 may be a means for interface with the input/output device 145. For example, the input device may include a device such as a microphone, keyboard, or mouse, and the output device may include a device such as a display or speaker. As another example, the input/output interface 140 may be a means for interface with a device in which functions for input and output are integrated into one, such as a touch screen. The input/output device 145 and the similar sound source search system 10 may be configured as one device.

In another embodiment, the similar sound source search system 10 may include fewer or more components than those shown in FIG. 1. However, it is not necessary to clearly show most of the prior art components. For example, the similar sound source search system 10 may be implemented to include at least some of the input/output devices 145 or may further include other components such as a transceiver and a database 130.

In one embodiment, as shown in FIG. 2, the processor 120 receives a reference sound source, analyzes it using CQT or frequency analysis, and inputs a genre extraction model, a SCALE classification model, a BPM extraction model, and a chord progression extraction model, respectively. to extract feature values for the genre, SCALE, BPM, and chord progression information of the reference sound source.

Further, among the sound sources stored in the database, sound source data having similar genre, scale, and bpm feature values are extracted, and matching sound sources are extracted by analyzing the similarity of chord progressions, and a search result can be derived with the most similar sound source.

Specifically, the processor 120 includes a sound source input unit 122, a sound source analysis unit 124, a sound source information extraction unit 126, and a matching sound source search unit 128.

The sound source input unit 122 receives a reference sound source. A reference sound source is a sound source that serves as a standard for users to search for similar sound sources, and there is no limit to its length or format. In one embodiment, the sound source input unit 122 may directly receive a file of a reference sound source. However, it is not limited thereto, and the sound source input unit 122 may be implemented by receiving song information from the user terminal 40 and downloading a sound source of a corresponding song posted on the web based on the input song information.

The sound source input unit 122 may be implemented to directly receive sound source data composed by the user from the user terminal 40 or receive a sound source as a method of downloading the corresponding sound source through a web crawling method by inputting sound source information that has been opened on the existing web, for example, song title or lyric information.

The sound source analysis unit 124 analyzes the waveform of the reference sound source input through the sound source input unit 122.

In one embodiment, the sound source analysis unit 124 performs a waveform analysis using CQT conversion or a frequency analysis on a waveform of a sound source in order to convert time-axis data into frequency-axis data. The sound source analysis unit 124 performs frequency analysis on the waveform of the reference sound source input to the sound source input unit 122. Accordingly, the waveform is analyzed using CQT, which can better express information about frequency at low frequencies and information about music flow at high frequencies.

If the CQT is drawn as a spectrogram, the X-axis becomes time and the Y-axis becomes frequency band, and all musical instrument sounds may be expressed as a two-dimensional view. This is more advantageous than the conventional Fourier transform in processing music because the frequency axis is transformed in a logarithmic unit and the resolution is processed in various ways according to each frequency (low frequency is low resolution, high frequency is high resolution). The sound source analysis unit 124 may increase the accuracy of sound source analysis using CQT.

The sound source information extraction unit 126 applies the analysis result from the sound source analysis unit 124 as an input value of the artificial intelligence model to extract sound source information data including at least one of a genre, beats per minute, scale, and chord progression information for a reference sound source by an artificial intelligence model.

The sound source information extractor 126 may be configured to include a neural network model that performs neural network learning and may be implemented as hardware, firmware, or software performed under the control of the processor 120.

The neural network model learned in the sound source information extractor 126 may be implemented with various deep learning techniques. for example, deep neural networks, convolutional deep neural networks, recurrent Boltzmann machines, restricted Boltzmann machines, deep belief networks, and deep Q-networks. Further, the neural network model in this embodiment includes the structure of an input layer, a hidden layer, and an output layer, like a well-known neural network, and performs a learning process including a learning process of generating a predicted value by connecting values of input data (feedforward) and a learning process of updating the weight of the connection to minimize the difference between the predicted value and the actual value (backpropagation).

In one embodiment, the sound source information extraction unit 126 includes a BPM extraction model, a genre extraction model, a scale classification model, and a chord progression extraction model.

BPM represents the tempo information of the sound source. Even sound sources belonging to the same genre can have different moods depending on the tempo. Therefore, a song with a similar tempo to the reference sound source can give the most similar feeling.

The first half of the BPM extraction model uses a convolutional neural network (CNN) layer to find local information such as timbre, pitch, and chord. In the second half, it is configured to rearrange the data according to time in order to find the time series information of the entire sound source, and then find one BPM value using the fully-connected (FC) layer. However, it is not limited thereto, and it is also possible to implement other deep learning models.

Similarly, the scale extraction model is configured to classify major scale and minor scale by putting the rearranged data into the CNN layer in the first half and the FC layer in the second half. However, it is not limited thereto, and it is also possible to implement other deep learning models.

The BPM extraction model applies the onset detection method to extract the beats of the section, and beat information may be used after being converted into tempo information or time signature information.

Since the instruments, rhythms, and scales of music used are different depending on the genre, the genre is important information for classifying sound sources.

In one embodiment, the first half of the genre extraction model uses vertical CNN layers and horizontal CNN layers by subdividing the CNN model to increase the level and speed of analysis. At this time, the vertical CNN layer calculates information for each frequency band in the sound source to find local information such as tone. Afterwards, the horizontal CNN layer analyzes the time-series information to find information about the progress of the music. In the second half of the genre extraction model, the Self-Attention layer is used to extract the correlation between data separated over time with the information extracted in the first half. However, it is not limited thereto, and it is also possible to implement other deep learning models.

The attention function calculates the degree of similarity with all keys for a given query. Then, the similarity is used as a weight and reflected in each value mapped with the key. Finally, it returns by weighting all the values that reflect the similarity.

At this time, self-attention is the attention that Q, K, and V come from the same source.

In one embodiment, the genre extraction model may extract feature values for genres using a genre classification method using spectrogram, mel-frequency cepstral coefficients (MFCC), chroma frequency, spikegram, and the like.

Chord progression is a factor that can determine the melody line of a sound source. The atmosphere of the music can also be different depending on beat that the chord changes. Therefore, when the chord progression is similar, even if the melody is different, it can give a feeling that the sound source is similar in a large frame.

In one embodiment, the chord progression extraction model consists entirely of a bidirectional self-attention layer. In the case of chord progression, since the temporal element is strong, only the self-attention layer can be configured to clearly find the relationship between the respective chords. Further, the bidirectional method of masking once on both sides may be adopted to clearly find the relationship between the respective chords.

The feature mainly used for chord recognition is the chroma feature, and the chord feature value can be extracted by a method of expressing the feature representing the distribution in 12 keys (C, Db, D, Eb, E, F, Gb, G, Ab, A, Bb, B) corresponding to one frame.

Scale is an element that identifies the atmosphere of a song, and through this, it is possible to first grasp the overall atmosphere of music in a large sense before the relatively resource-intensive chord progression comparison task, and to narrow down the candidates for finding similar sound sources.

Further, the sound source information extraction unit 126 may apply a method such as mel-frequency cepstral coefficient (MFCC) analysis, thereby extracting information about the timbre distribution of a specific section, that is, musical instrument composition, to extract timbre feature values, extract the tempogram of the reference sound source and the generated sound source through short-time Fourier transform (STFT), and further extract the melody feature value extracted by tracking the pitch contour corresponding to the main melody of the corresponding part, and the harmony feature value extracted based on the tempogram calculated through STFT similarly to the melody extraction.

The sound source information extraction unit 126 may perform learning on sound sources for each learning field that is distinguished or identified according to the feature values or feature value patterns by the neural network model.

The matching sound source search unit 128 compares the sound source information data stored in the database 130 with the sound source information data of the reference sound source extracted by the sound source information extractor 126, and searches for a matching sound source that matches a predetermined standard or more.

The matching sound source search unit 128 serves to find the most similar sound source in the database 130 using the extracted sound source information.

Genres can be used in the initial stage of classifying sound sources because the instrument groups, rhythms, and musical scales used are different depending on the genre.

Therefore, after narrowing down the category of sound source data stored in the database 130 step by step in the order of genre, scale, and BPM, the sound source with the most similar chord progression in the corresponding category is determined as the sound source most similar to the reference sound source.

Accordingly, the matching sound source search unit 128 may extract a sound source most similar to the reference sound source from the database 130.

That is, when a user inputs a sound source to find similar music, that is, a reference sound source, the artificial intelligence-based similar sound source search system 10 according to an embodiment may automatically extract a similar sound source.

The matching sound source search unit 128 determines the similarity of chord progressions between two sound sources. To this end, the similarity is calculated using a deep learning model or through a general formula. Through this, it is possible to accurately identify the relationship between the ongoing chord constructions. The similarity is expressed as a value between 0 and 1, and the closer the value is to 1, the more similar the chord progression can be determined.

In one embodiment, the matching sound source search unit 128 is not limited to extracting the most similar sound source data with the highest similarity and providing it as a search result and may extract and provide at least two or more similar sound source data by applying different matching ranges for identifying similar ranges.

For example, a sound source with a matching rate of 95% or higher may be searched for, or a sound source with a matching rate of 80% or higher may be selected as a matching sound source, and at least one sound source data having a similarity of a standard value or higher may be extracted and provided.

Further, when at least one or more selected sound source data exists, a matching sound source list displaying matching rate information for each sound source data may be provided.

Accordingly, users can prevent copyright infringement in advance by inputting the sound source data they have created as a reference sound source and searching for sound sources that have a certain level of similarity with the reference sound source among a large number of sound source data posted on sound source sites on the web.

Further, it is possible to receive recommendations for sound source data showing a certain level or higher matching rate with the preferred sound source data, so that a preferred music genre or music with a preferred atmosphere can be recommended with high accuracy, thereby increasing satisfaction.

Further, the matching sound source search unit 128 is not limited to extracting and providing sound source data having a high similarity among sound source data stored in the database 130, but also receives data input as a reference sound source and the comparison target sound source from the user to further determining the similarity between the reference sound source and the comparison target sound source input, thereby providing similarity information.

Accordingly, the user can figure out where and how much differentiation is needed by comparing the sound source data he/she created with a specific sound source that the user want to know how similar they are, so that it can be used as a standard for judging originality when creating a new sound source.

Further, the artificial intelligence-based similar sound source search system according to an embodiment may receive information on copyright registration standard from a copyright association and also provide information on whether or not it is subject to copyright registration and information necessary for copyright registration when similar sound source data is not found or when the similarity with the searched sound source data is below a certain level.

Figure 3:
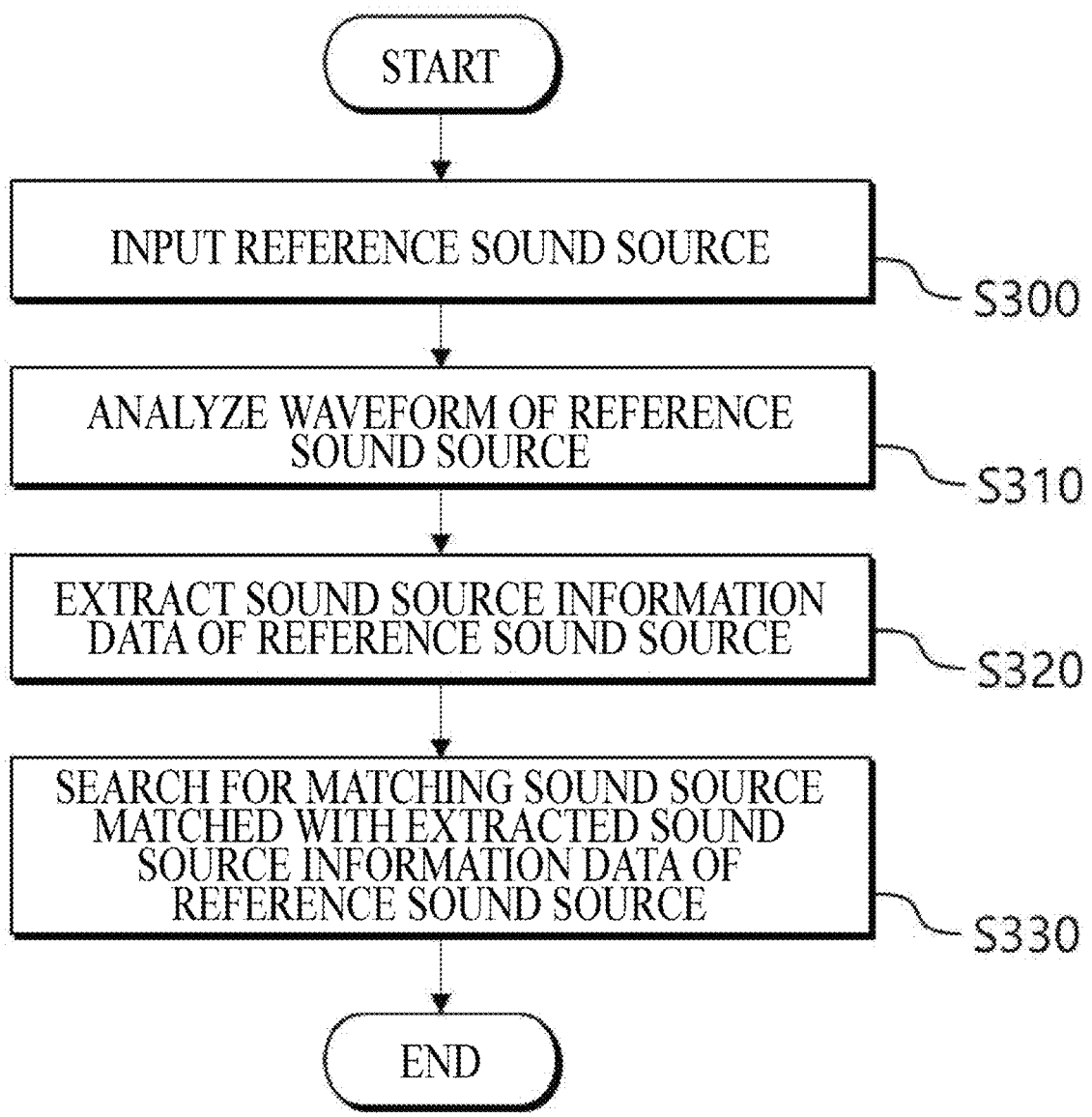
FIG. 3 is a flowchart showing the configuration of an artificial intelligence-based similar sound source search system according to an embodiment of the present disclosure.

FIG. 3 is a flowchart for showing the configuration of an artificial intelligence-based similar sound source search system according to an embodiment of the present disclosure.

The artificial intelligence-based similar sound source search system 10 according to an embodiment may provide an expert consultation service through access to a dedicated application installed on a user terminal 40 or a web/mobile site related to the similar sound source search system 10.

For example, the similar sound source search system 10 may be implemented in the form of a program that operates independently or may be configured in the form of an in-app of a specific application and can be implemented to operate on the specific application.

The processor 120 of the similar sound source search system 10 may include at least one or more components as components for performing the expert consultation providing method according to FIG. 3.

Depending on embodiments, components of the processor 120 may be selectively included in or excluded from the processor 120. Components of the processor 120 according to embodiments may be separated or integrated to express functions of the processor 120.

The processor 120 and components of the processor 120 may control the similar sound source search system 10 to perform steps S300 to S330 included in the similar sound source search method of FIG. 3. For example, the processor 120 and components of the processor 120 may be implemented to execute instructions according to an operating system code included in the database 130 and at least one program code.

Here, components of the processor 120 may be representations of different functions performed by the processor 120 according to instructions provided by program codes stored in the computer device 200.

The processor 120 may read necessary instructions from the database 130 loaded with instructions related to control of the similar sound source search system 10. In this case, the read instruction may include an instruction for controlling the processor 120 to execute steps to be described later (S300 to S330).

Steps to be described later (S300 to S330) may be performed in an order different from the order shown in FIG. 3, and some of the steps (S300 to S330) may be excluded or an additional step may be further included.

Referring to FIG. 3, the artificial intelligence-based similar sound source search method executed in a computer device according to an embodiment first receives a reference sound source (S300).

Then, the waveform of the reference sound source received in the sound source input step is analyzed (S310).

In one aspect, the sound source analysis step performs waveform analysis using constant Q transform (CQT) or frequency analysis on the waveform of the sound source.

Then, the sound source information data may be extracted including at least one of genre, beats per minute (BPM), scale, and chord progression information for a reference sound source by applying the analysis result of the sound source analysis step as an input value of an artificial intelligence model by the artificial intelligence model (S320).

Here, the sound source information extraction step includes a BPM extraction model, a genre extraction model, a scale classification model, and a chord progression extraction model.

Then, the sound source information data stored in the database is compared with the sound source information data of the reference sound source extracted in the sound source information extraction step to search for a matching sound source matching a predetermined standard or more (S330).

At this time, the matching sound source search step may extract and provide the sound source data with the highest similarity as a search result or may receive predetermined similarity standard information and provide at least one matching sound source matching a predetermined standard or more as a search result.

The method may be implemented as an application or implemented in the form of program instructions that can be executed through various computer components and may be recorded on a computer-readable recording medium. The computer readable recording medium may include program instructions, data files, data structures, etc. alone or in combination.

Program instructions recorded on the computer-readable recording medium may be those specially designed and configured for the present disclosure, or those known and usable to those skilled in the art of computer software.

Examples of computer-readable recording media include magnetic media such as hard disks, floppy disks and magnetic tapes, optical recording media such as CD-ROMs and DVDs, and magneto-optical media such as floptical disks. and hardware devices specially configured to store and execute program instructions, such as ROM, RAM, flash memory, and the like.

Examples of program instructions include high-level language codes that can be executed by a computer using an interpreter or the like as well as machine language codes generated by a compiler. The hardware device may be configured to act as one or more software modules to perform processing according to the present disclosure and vice versa.

The above has been described with reference to embodiments, but those skilled in the art will understand that various modifications and changes can be made to the present disclosure without departing from the spirit and scope of the present disclosure described in the claims below.

What is claimed is:

1. An artificial intelligence-based similar sound source search system comprising:
   a sound source input unit configured to receive a reference sound source;
   a sound source analysis unit configured to analyze waveform of the reference sound source input through the sound source input unit;
   a sound source information extraction unit for configured to extract sound source information data including at least one of genre, beats per minute (BPM), scale, and chord progression information for the reference sound source by applying a result of the analysis of the sound source analysis unit as an input value of an artificial intelligence model by the artificial intelligence model; and
   a matching sound source search unit configured to search for a matching sound source that matches a predetermined standard or more by comparing the sound source information data stored in a database with the sound source information data of the reference sound source extracted from the sound source information extraction unit,
   wherein the sound source information extraction unit includes a genre extraction model,
   wherein the genre extraction model calculates information for each frequency band in the reference sound source, performs time series analysis and uses deep learning models including a convolutional neural network (CNN) model and self-attention to extract correlations between data,
   wherein a first half of the genre extraction model uses vertical CNN layers and horizontal CNN layers by subdividing the CNN model such that the vertical CNN layers calculate the information for each frequency band and the horizontal CNN layers analyze time-series information of the reference sound source to find information about progress of music,
   wherein a second half of the genre extraction model uses the self-attention to extract the correlations between data,
   wherein the CNN model performs a learning processing including a learning process of generating a predicted value by connecting values of the reference sound source and a learning process of updating weight of the connection values to minimize a difference between the predicted value and an actual value, and
   wherein the sound source input unit, the sound source analysis unit, the sound source information extraction unit, and the matching sound source search unit are each implemented via at least one processor electrically connected to a memory.

2. The system of claim 1, wherein the sound source analysis unit is further configured to perform waveform analysis using constant Q transform (CQT) or frequency analysis on the waveform of the reference sound source.

3. The system of claim 1, wherein the sound source information extraction unit further includes a BPM extraction model, a SCALE classification model, and a chord progression extraction model.

4. The system of claim 3, wherein the BPM extraction model identifies timbre, pitch, and chord information by convolutional neural network (CNN) and derives a BPM value using fully-connected (FC) or other deep learning models.

5. The system of claim 3, wherein the SCALE classification model identifies timbre, pitch, and chord information by convolutional neural network (CNN) and derive a SCALE value using fully-connected (FC) or other deep learning models.

6. The system of claim 3, wherein the chord progression extraction model derives chord information by extracting a relationship between chords using a deep learning model including bidirectional self-attention.

7. The system of claim 1, wherein the matching sound source search unit is further configured to receive a predetermined standard for searching for a matching sound source that matches a predetermined standard or more.

8. An artificial intelligence-based similar sound source search method executed on a computer device,
   wherein the computer device includes at least one processor electrically connected to a memory and configured to execute computer readable instructions contained in the memory,
   wherein the artificial intelligence-based similar sound source search method comprises:
   a sound source input step for receiving a reference sound source;
   a sound source analysis step for analyzing waveform of the reference sound source input through the sound source input step;
   a sound source information extraction step for extracting sound source information data including at least one of genre, beats per minute (BPM), scale, and chord progression information for the reference sound source by applying a result of the analysis of the sound source analysis step as an input value of an artificial intelligence model by the artificial intelligence model; and
   a matching sound source search step for searching for a matching sound source that matches a predetermined standard or more by comparing the sound source information data stored in a database with the sound source information data of the reference sound source extracted from the sound source information extraction step, wherein the sound source information extraction step includes a genre extraction model, wherein the genre extraction model calculates information for each frequency band in the reference sound source, performs time series analysis and uses deep earning models including a convolutional neural network (CNN) model and self-attention to extract correlations between data, wherein a first half of the genre extraction model uses vertical CNN layers and horizontal CNN layers by subdividing the CNN model such that the vertical CNN layers calculate the information for each frequency band and the horizontal CNN layers analyze time-series information of the reference sound source to find information about progress of music, wherein a second half of the genre extraction model uses the self-attention to extract the correlations between data, and wherein the CNN model performs a learning processing including a learning process of generating a predicted value by connecting values of the reference sound source and a learning process of updating weight of the connection values to minimize a difference between the predicted value and an actual value.

9. The method of claim 8, wherein the sound source analysis step performs waveform analysis using constant Q transform (CQT) or frequency analysis on the waveform of the reference sound source.

10. The method of claim 8, wherein the sound source information extraction step further includes a BPM extraction model, a scale classification model, and a chord progression extraction model.

11. The method of claim 8, wherein the matching sound source search step receives a predetermined standard for searching for a matching sound source that matches a predetermined standard or more.

* * * * *